United States Patent [19]

Wenskus, Jr. et al.

[11] Patent Number: 5,246,644

[45] Date of Patent: Sep. 21, 1993

[54] METHOD FOR CHARACTERIZING THE PERFORMANCE OF AN INJECTION MOLDING PROCESS

[75] Inventors: James J. Wenskus, Jr.; Michael W. Dupin, both of Rochester, N.Y.

[73] Assignee: Eastman Kodak Company, Rochester, N.Y.

[21] Appl. No.: 864,828

[22] Filed: Apr. 7, 1992

[51] Int. Cl.$^5$ ............................................. B29C 45/76
[52] U.S. Cl. .................................. 264/40.1; 264/40.5; 264/40.6; 425/135; 425/143; 425/149
[58] Field of Search ..................... 264/40.1, 40.5, 40.6; 425/135, 143, 145, 149, 162, 170

[56] References Cited

U.S. PATENT DOCUMENTS 4,816,197  3/1989  Nunn ................................. 264/40.1
5,176,858  1/1993  Tsukabe et al. ..................... 264/40.1

OTHER PUBLICATIONS

"Optimal Discrete Approximations for Continuous Outcomes with Applications in Decision and Risk Analysis", Authors: Zaino and D'Errico, published in Operational Research Society, vol. 40, No. 2, 1989, pp. 101–110.

"Statistical Tolerancing Using a Modification of Taguchi's Method", Authors: D'Errico and Zaino, published in Technometrics, vol. 30, No. 4, pp. 397–405.

"Off-Line Quality Analysis of Injection Molded Parts Using Experimental Design", Authors: Henza and Lipowicz, published in Society of Plastics Engineers, 1986.

"Fabrication of Ceramics: the Challenge Continues", Author: Sheppard, published in American Ceramic Society Bulletin, 1989.

"Molding Process is Improved by Using the Taguchi Method", Author: Warner, J. C., published in Modern Plastics, vol. 66, No. 7, 1989.

Primary Examiner—Jill L. Heitbrink
Attorney, Agent, or Firm—Joshua G. Levitt; Charles E. Snee, III; Robert E. Heslin

[57] ABSTRACT

The critical dimensions of product samples made during a standard certification procedure for an injection molding process are measured and a loss factor value is computed for each such dimension. Using statistical techniques, the largest loss factor value is partitioned into percentages of loss contributed by a predetermined set of loss elements. The loss element contributing the largest percentage is corrected so as to improve the quality of the process and the product. The method provides a way of determining what kinds of process corrections will most effectively improve product and process quality.

10 Claims, 7 Drawing Sheets

METHOD FOR CHARACTERIZING THE PERFORMANCE OF AN INJECTION MOLDING PROCESS

FIELD OF THE INVENTION

This invention relates to the field of injection molding, and more particularly, to an improved method for quantitatively characterizing the quality and performance of an injection molding process and the product produced therefrom.

BACKGROUND OF THE INVENTION

In the injection molding art, it is desirable to quantitatively measure the performance and capability of both the injection molding process and the product produced therefrom. The techniques currently used for this purpose are commonly referred to as "process capability indices". These indices are less than ideal because they are based on two false assumptions: (1) that the process/product characteristics are statistically symmetrical and (2) the quality of all products within the established range of specifications are the same, even though some are closer to ideal dimensions than others.

A more meaningful characterization of the performance of an injection molding process could be achieved in a method which takes account of the realities concerning the process, i.e., that product characteristics are not statistically symmetrical and that the quality or value of a product which is within specifications decreases as its dimensions vary from ideal dimensions.

Those skilled in the art are undoubtedly familiar with the Taguchi loss function concept. According to this concept, a product within an acceptable range of dimensional specifications is considered to be most valuable if its dimensions match the ideal dimensions for that product. As a dimension varies from the ideal dimension, its value decreases quadratically as it reaches specification tolerance limits. The Taguchi concept is applied and extended to the injection molding process according to the subject invention by treating data from parts produced during a standard process robustness certification procedure as a "designed experiment". Those familiar with the art of injection molding know that it is customary to certify that a given process is sufficiently robust. This certification is accomplished through the use of a molding area diagram in which the molding process is performed at a selected number of data points at the extremes and midpoints of temperature and pressure for that process.

Each part characteristic or measurement can be quantitatively partitioned into the four injection molding process elements affecting manufacturing capability: (1) target error; (2) cavity bias; (3) process error; and (4) other.

It is, therefore, an object of this invention to provide an improved method for characterizing the performance of an injection molding process.

It is a further object of this invention to provide a method of the type described which takes account of the statistical asymmetric nature of injection molding data.

It is a further object of this invention to provide a method of the type described which takes advantage of the Taguchi loss function concept.

It is a further object of this invention to provide a method of the type described which can be applied to existing robustness certification methods.

It is a further object of this invention to provide a method of the type described which results in the identification of the process error elements most in need of correction.

SUMMARY OF THE INVENTION

Briefly described, this invention concerns a method for controlling the quality of an injection molded product being made with a temperature and pressure-controlled molding machine. The method involves the making of sample products during the standard robustness certification procedure at a plurality of temperature-pressure settings spread over the operating range appropriate for the molding material, mold and machine combination being used. Once the samples are prepared, the method calls for determining which dimension of the molded product has the highest associated loss factor. That dimension is selected and its loss factor is partitioned into percentages of loss contributed by predetermined loss elements. Any loss element contributing more than a predetermined percentage to the loss factor is then adjusted by making appropriate changes in the molding equipment or in the operating parameters. The method thus provides a technique for controlling an injection molding process and for controlling product quality.

DETAILED DESCRIPTION OF THE DRAWINGS

Figure 1:
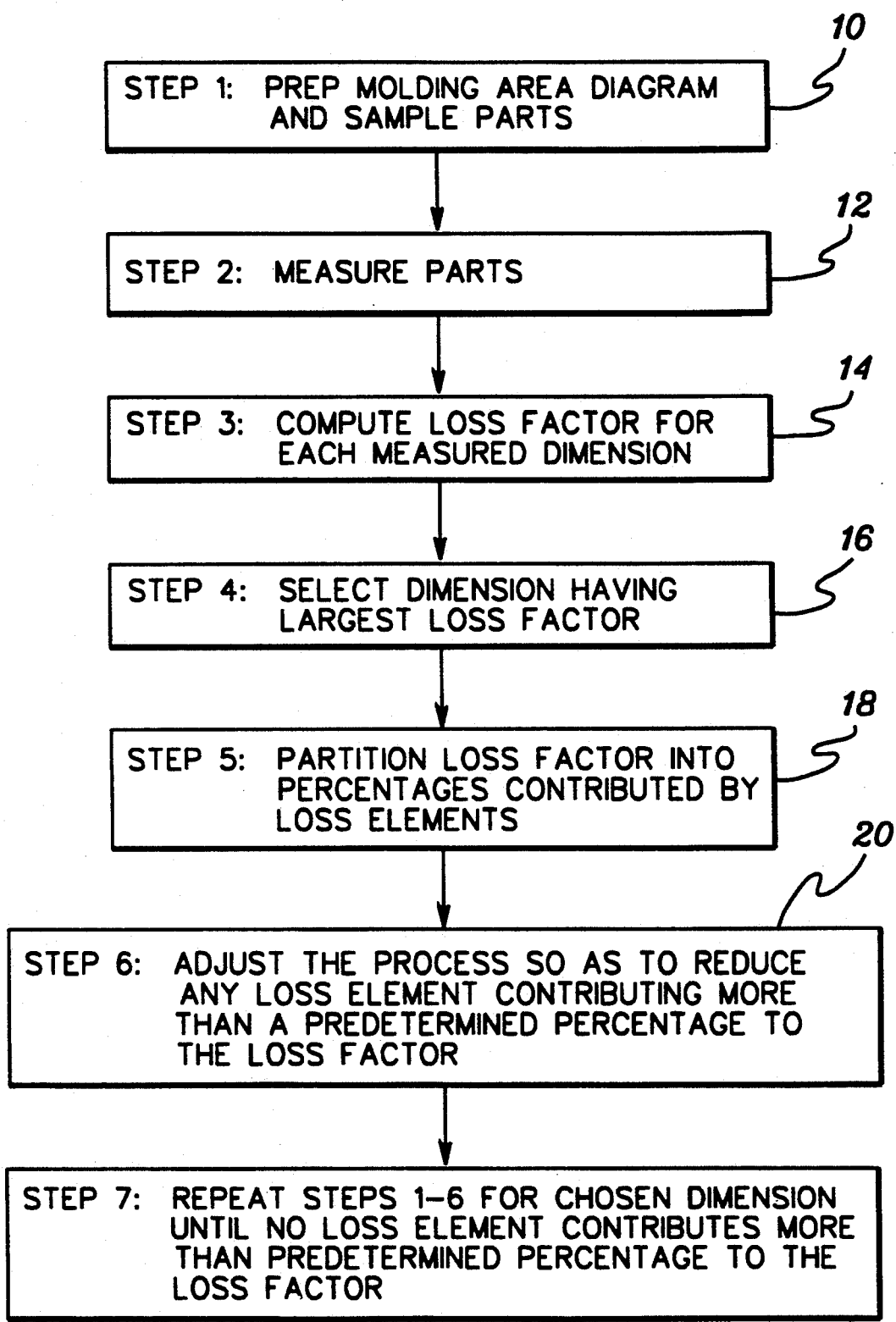
FIG. 1 is a flowchart illustrating the major steps followed in practicing the subject invention.

The overall method of this invention is illustrated in the flowchart shown in FIG. 1. Step 1, illustrated in block 10, calls for the preparation of a molding area diagram. This step will be described in detail with reference to FIG. 2. However, it generally involves the preparation of a collection of product samples throughout the temperature and operating ranges found to be workable for the particular molding machine, mold and molding material being used.

Step 2, illustrated in block 12, calls for the measurement of the parts made in step 1. For a part of average complexity, there may be several dimensions which should be measured in order to fully obtain the benefits of this invention. The choice of dimensions to be measured depends upon the functional relationship between the part being analyzed and other parts with which it must cooperate in a finished product. Typically, certain dimensions must be held within certain tolerances if the part is to perform satisfactorily in its intended environment.

Step 3, illustrated in block 14, calls for the computation of a loss factor for each measured dimension. This computation will be described below. However, it should be understood that "loss factor", as used in this application, is a numerical value representative of a loss in product value due to error in a particular dimension. Once the loss factors have been computed, they can easily be ranked so that the dimension having the largest associated loss factor can be identified. Step 4 is illustrated in block 16 and calls for the selection of the dimension having the highest loss factor. It may well be in some cases that the dimension detracting most seriously from the product value is well known. In such a case, Step 3 need be performed only in connection with that particular dimension and Step 4 can be omitted altogether.

Step 5 illustrated in block 18, calls for partitioning the loss factor associated with a chosen dimension into percentages contributed by known loss elements. The partitioning step will be explained in detail hereinafter. The loss elements associated with the injection molding process are generally considered to be: (1) target error; (2) cavity bias; (3) process error and (4) other. Certain techniques are available to adjust each of these loss elements; however, it is usually impractical and unnecessarily expensive to adjust all of them. Thus, a significant advantage gained by practicing this invention is that corrective measures can be directed to where they are most needed and where they will be most effective in reducing the loss factor associated with a particular dimension. Since the los factor is based essentially on monetary considerations, the above described approach provides the most direct way of reducing loss of product value during the injection molding process.

The corrective measures to be taken are known to those skilled in the art and, of course, depend upon the loss element singled out for attention. Target error, for example, is usually caused by defects in the mold design. Thus, correction of this error calls for modification of the mold configuration. Cavity bias, on the other hand, is caused primarily by an uneven filling of the various cavities in a mold and certain techniques are available to correct this condition. Similarly, if the partitioning step shows that process error is pronounced, specialized process controls may be used to minimize process variations. Finally, the so called "other" loss element is caused primarily by measurement errors related to the gauging fixtures or procedures being employed. Here again many well known options are available.

The method of this invention can be practiced in an iterative manner, as indicated by step 7, block 22 which calls for the repetition of steps 1-6 for a chosen dimension until no loss element for that dimension contributes more than the predetermined percentage to the loss factor.

Figure 2:
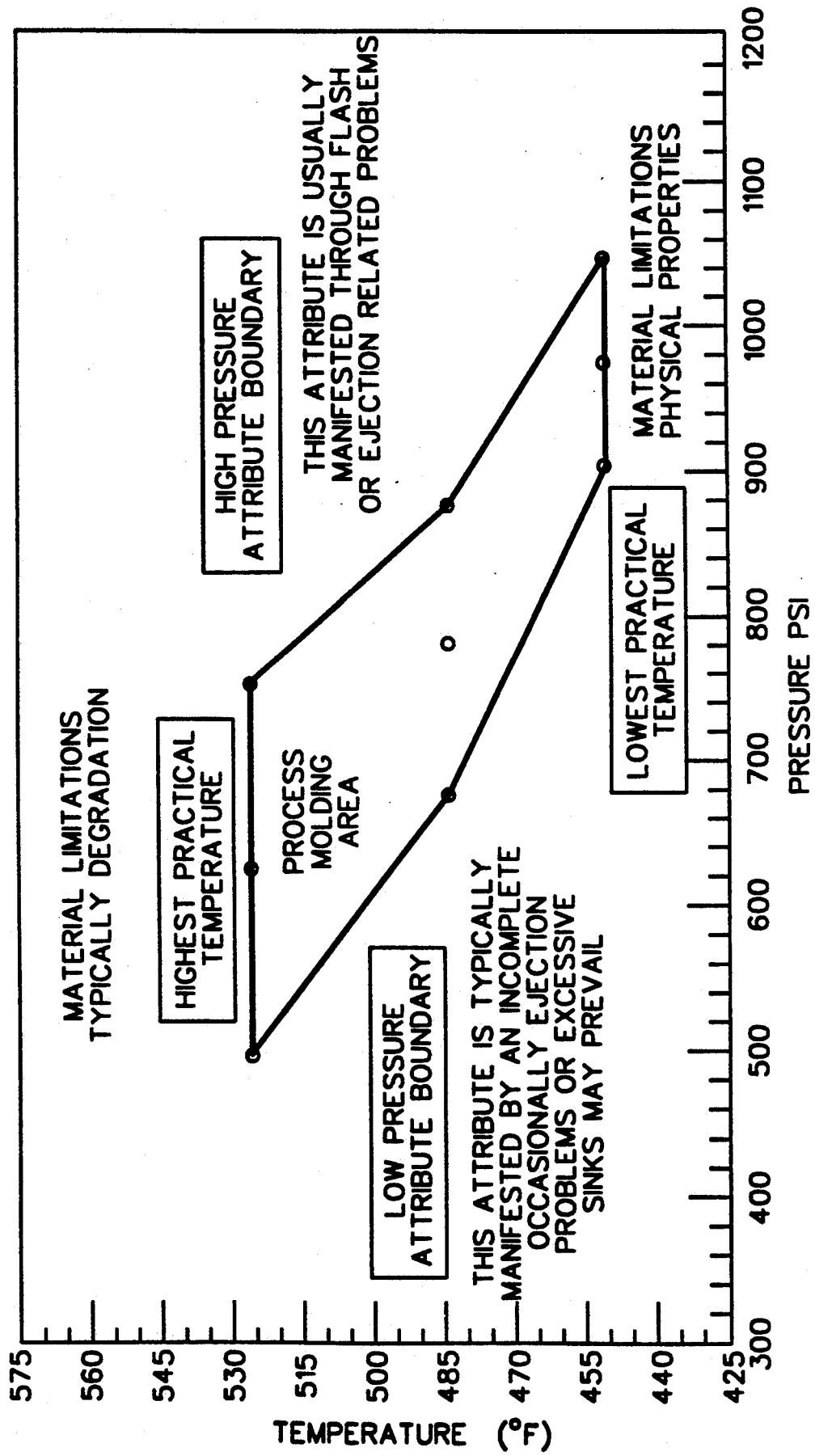
FIG. 2 is a molding area diagram typical of that used in practicing the subject invention.

FIG. 2 depicts a typical molding area diagram. As is known to those skilled in the art, a molding area diagram is a plot of injection pressure against temperature. The purpose of this plot is to illustrate the practical operating ranges for hydraulic injection oil pressure and molding material temperature. The resulting geometric figure encloses an area or window entitled "process molding area" within which acceptable combinations of pressure and temperature are found. These two parameters are, of course, controllable in production molding equipment. As shown, the use of pressure-temperature combinations outside the process molding area will result in gross attribute failures such as flash-or ejection-related problems, incomplete products, etc. Thus, the boundaries of the process molding area represent the extremes of pressure-temperature combinations within which a satisfactory molding operation can take place.

As is also known to those skilled in the art it is customary to prepare a standard molding area diagram upon completion of the work involved with setting up a molding process for a new molded product or part. This is done as a means of verifying the process parameters of pressure and temperature before production. Preparation of the standard molding area diagram typically involves running the process at three levels of temperature and three levels of pressure at each temperature. The selected temperatures are normally the lowest and the highest practical temperatures for the molding material being used and the median temperature. At each temperature, parts are made at the lowest and the highest acceptable pressure and at the median pressure. Thus, this procedure results in parts being made under nine different conditions. Those skilled in the art will appreciate that the molding area diagram verification process can be performed with fewer or more data points. In any event, this verification process will result in having one or more samples of the part produced at each of the chosen pressure-temperature data points. These sample parts, of course, vary in part weight and in their various dimensions due to the differences in the temperature-pressure combinations under which they are made. If a multicavity mold is used, there will also be differences in part weight and part dimensions based upon cavity location within the mold. It is well known, for example, that in multicavity molding, each cavity of the mold fills at a different time and there are differences in flow paths, temperature and gating/rheological effects all of which contribute to the noted differences in the molded parts.

Figure 3:
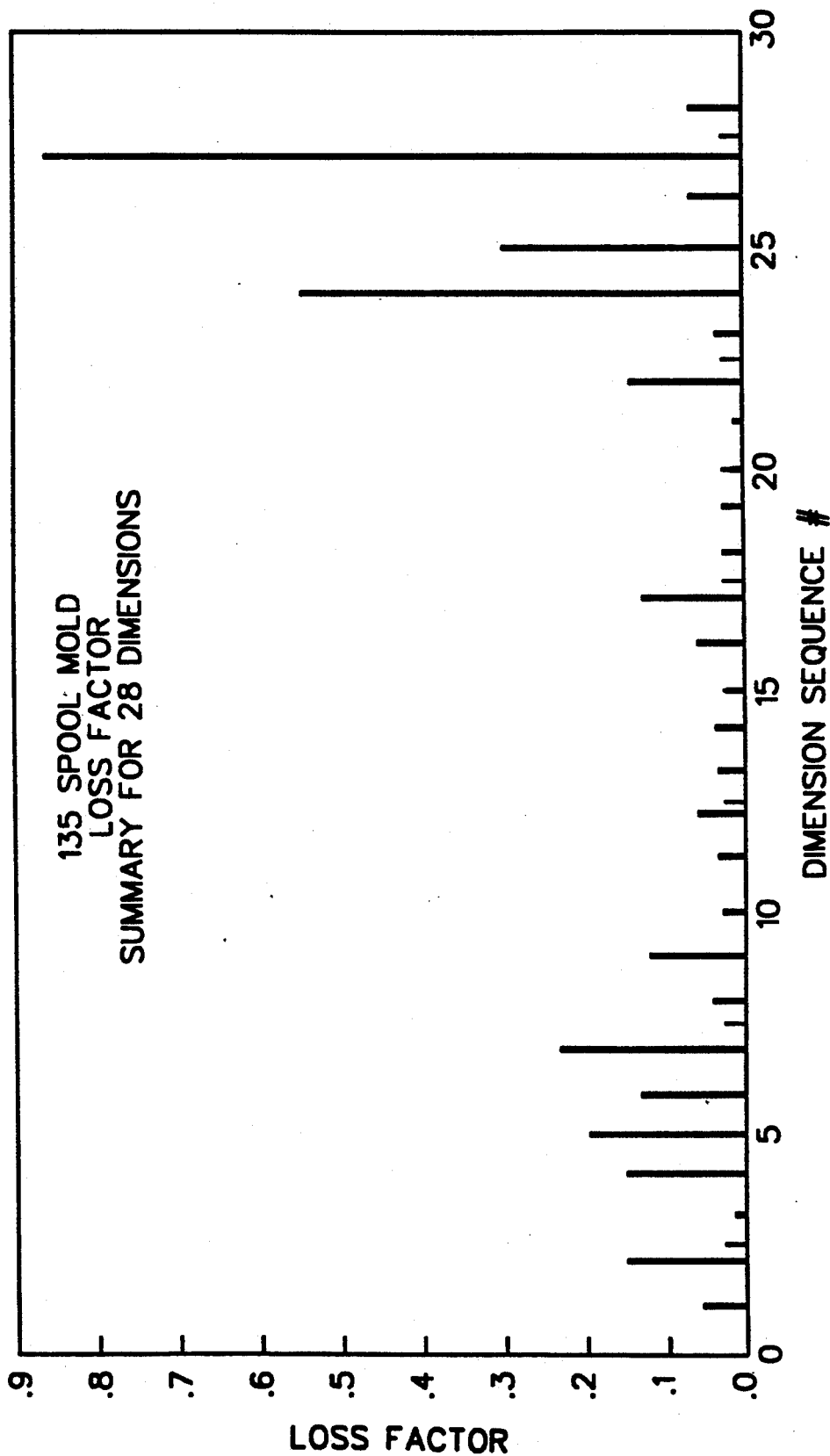
FIG. 3 is a bar graph illustrating, as an example, the distribution of loss factor values associated with a plurality of measured product dimensions.

An example of an application of the subject invention involved the production of a plastic spool for 35 mm photographic film using a 32 cavity mold. The standard molding area diagram verification procedure was followed and 28 dimensions were measured on the resulting sample parts. The resulting data is set forth in table 1 below in which the column headings have the following meanings:

FIG. 3 Seq #—correlates the sequence in which the 28 dimensions are plotted on the bar graph shown in FIG. 3.

Dim. ID—is merely an identification number for each of the 28 dimensions.

Loss Factor—is the value obtained for each of the 28 dimensions by applying the formula described below.

Loss Rank—is an indication of the magnitude of a particular loss factor as compared to the other 27 dimensions. For example, dimension S21 has a loss factor of 0.85891 which ranks first in magnitude.

The Aim, Bias, Process and Other columns set forth the percentages resulting from partitioning the loss factor into the four loss elements as mentioned above.

TABLE 1

| FIG. 3 Sec # | Dim. ID | Loss Factor | Loss Rank | Aim % | Bias % | Proc % | Other % |
|---|---|---|---|---|---|---|---|
| 1 | S1 | 0.00142 | 12 | 15 | 53 | 21 | 11 |
| 2 | S2 | 0.15639 | 7 | 91 | 1 | 7 | 1 |
| 3 | S3 | 0.01766 | 26 | 30 | 36 | 29 | 5 |
| 4 | S4S | 0.15888 | 6 | 91 | 6 | 1 | 2 |
| 5 | S4L | 0.19096 | 5 | 59 | 27 | 7 | 6 |
| 6 | S5S | 0.13931 | 8 | 45 | 25 | 20 | 11 |
| 7 | S5L | 0.24049 | 4 | 69 | 17 | 9 | .5 |
| 8 | S6 | 0.04733 | 17 | 7 | 55 | 26 | 12 |
| 9 | S7 | 0.12394 | 11 | 51 | 21 | 8 | 21 |
| 10 | S8 | 0.03471 | 21 | 14 | 51 | 13 | 22 |
| 11 | S9 | 0.39516 | 18 | 21 | 31 | 11 | 37 |
| 12 | S10 | 0.05381 | 15 | 76 | 5 | .1 | 17 |
| 13 | S11L | 0.03595 | 20 | 72 | 6 | 2 | 20 |
| 14 | S11R | 0.03910 | 19 | 76 | 5 | 1 | 17 |
| 15 | S12 | 0.02715 | 23 | 62 | 5 | 8 | 25 |
| 16 | S13 | 0.05969 | 13 | 18 | 48 | 4 | 30 |
| 17 | S14 | 0.12571 | 10 | 48 | 31 | 7 | 14 |
| 18 | S15 | 0.02255 | 24 | 43 | 48 | 0 | 9 |
| 19 | S16 | 0.01947 | 25 | 71 | 9 | 3 | 16 |
| 20 | S17L | 0.00857 | 28 | 7 | 78 | 0 | 16 |
| 21 | S17R | 0.01191 | 27 | 0 | 88 | 1 | 10 |
| 22 | S18L | 0.13885 | 9 | 91 | 5 | 2 | 3 |
| 23 | S18S | 0.03131 | 22 | 77 | 8 | 7 | 8 |
| 24 | S19L | 0.54701 | 2 | 80 | 12 | 4 | 4 |
| 25 | S19S | 0.29794 | 3 | 93 | 3 | 2 | 1 |
| 26 | S20 | 0.05668 | 14 | 1 | 37 | 40 | 23 |
| 27 | S21 | 0.85891 | 1 | 99 | 0 | 0 | 0 |
| 28 | S22 | 0.05011 | 16 | 87 | 2 | 0 | 11 |

FIG. 3 is a bar graph in which each of the 28 dimensions are plotted against loss factor. It will be observed that the relative magnitude of the various loss factors are easily identified.

Figure 4:
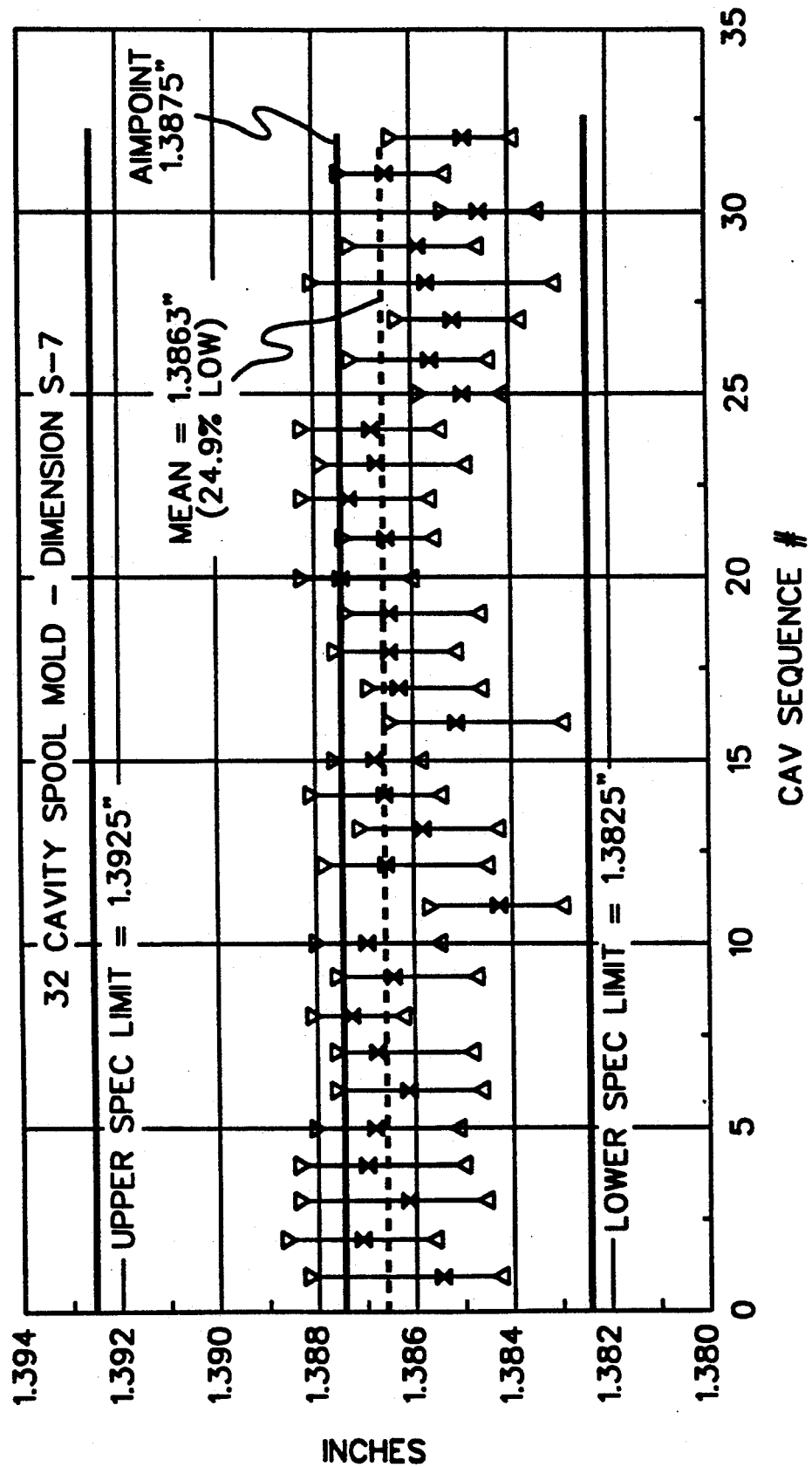
FIG. 4 is a graphic illustration of a typical product analysis for a single product dimension.

In the preferred embodiment of this invention, the dimension showing the greatest loss factor is addressed first. The object, of course, is to reduce the loss factor, thereby maintaining a higher value for the resulting part. Preliminary information can be obtained with use of a graphical display such as that shown in FIG. 4. In that figure, the data for a particular dimension, in this case, dimension S7, FIG. 3 Sequence No. 9, is plotted for each of the 32 cavities in the mold used in the example under discussion. The data for each cavity is represented as a vertical bar having a triangular symbol at its upper and lower extremes. The triangles represent the maximum and minimum measured values of the dimension under consideration for the sample parts made by the cavity in question. The "X" indicates the mean value. FIG. 4 also shows the aim point, i.e., the desired or ideal magnitude of the dimension in question, as well as the upper and lower specification limits. The actual mean for the 32 cavities is indicated by the dashed horizontal line. It will be noted that the actual mean in this example is 24.9% below the aim point. It may also be seen that there is a significant variation on a cavity by cavity basis in the mean value for the dimension under consideration. The algorithm discussed herein provides information on the severity of this cavity bias problem and the contribution it makes to the loss factor.

Referring to the table set forth above, it will be noted that 51% of the loss factor is attributable to the process being "off-aim" while 21% is attributable to cavity bias, 8% to process errors and 21% to "other". Clearly, the greatest improvement in product value can be achieved by centering the process. Ordinarily, this can be done by modifying the mold design. The important point is that the method of this invention provides a way of identifying the loss element making the greatest contribution to loss of product value. Armed with this information, the operator can confidently proceed to correct the process in a way which is most likely to reduce the most prominent loss factor.

Figure 5A:
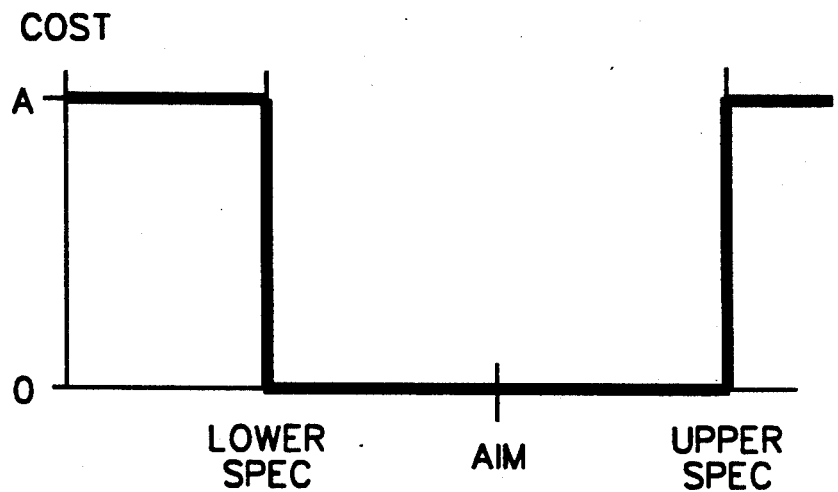
FIG. 5(a) is a graphical representation of the traditional cost analysis associated with products judged to be "in spec" or "out of spec"

FIG. 5(a) is an illustration of the traditional view of loss associated with production of molded parts. In the traditional evaluation of a process performance, parts are judged to be either "in spec" or "out of spec". The "out of spec" parts, if detected by some inspection, are scrapped or reworked and there is some cost, denoted by A, associated with this action. The "in spec" parts are shipped on to subsequent operations and eventually to the customer in the form of finished goods. In this traditional view, all parts that meet the specifications are considered to be equally fit for use.

Computation of the Loss Factor

Figure 5B:
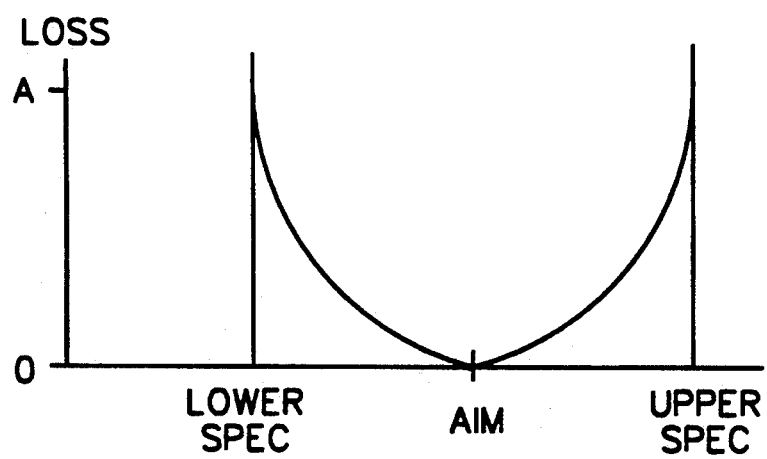
FIG. 5(b) is an illustration of a quadratic loss curve according to the present invention showing how an implied loss varies for product dimensions within prescribed specification limits.

In contrast to the traditional view described above, a Loss Function concept has been developed in recent years by Taguchi, as is known in the art. See, for example, "Introduction to Quality Engineering" by Genichi Taguchi, Kraus International Publications, White Plains, N.Y. Taguchi's Loss Function concept suggests that all parts that are within specifications are not "equally good". The concept recognizes that parts that are on aim are more desirable than those parts which are just inside specifications. Both are "in spec" and will be passed on through the production process. However, there will likely be more problems in final assembly or some deterioration of the final product performance due to the parts that are not on aim. Experience has shown that the loss within the specifications can be approximated by a quadratic loss function equation of the form:

$$L(x) = k(x - aim)^2 \tag{1}$$

where L is the loss as a function of a particular dimension (x), x is the value of the product measurement in question, "aim" is the desired or ideal magnitude of the dimension and k is a factor determined by the specification range and the cost of scrapping or reworking out-of-spec parts. In fact, $$k = A/(aim - spec)^2$$

where "spec" is the upper or lower limit of acceptability established for a given dimension. Thus, the quantity in parenthesis is the established tolerance. The general form for the quadratic loss curve for equation (1) above is shown in FIG. 5(b).

Figure 6:
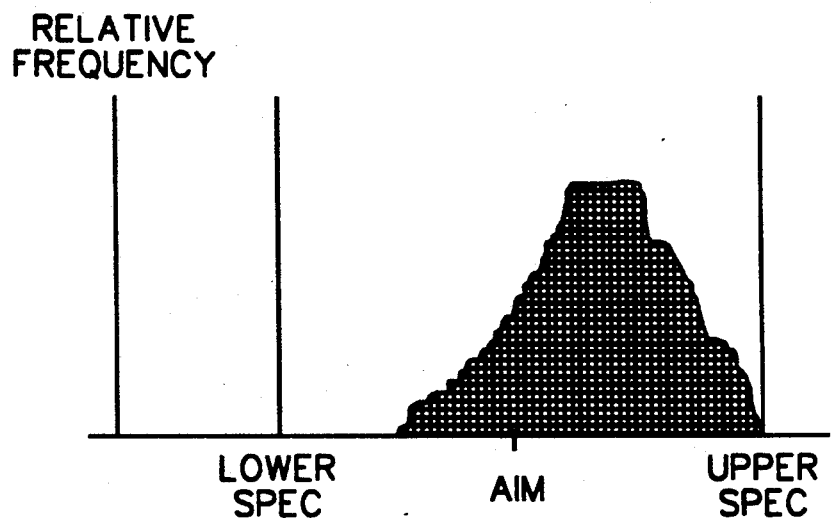
FIG. 6 is a graphical representation showing a typical distribution of products within specification limits.

Consider a process that produces parts with some distribution of the product measurement, as shown in FIG. 6. To use the loss function to characterize the performance of such a process in accordance with the subject invention, one could theoretically examine the loss associated with each of the parts that the process produces. However, it is possible to compute the average loss per part, denoted by AL, for the process distribution of N parts, as follows:

$$AL = \Sigma L(x_i)/N \tag{2}$$

$$AL = \Sigma k(x_i - aim)^2/N \tag{3}$$

and it can be shown that (3) can be re-expressed as:

$$AL = k[(\mu - aim)^2 + \sigma_t^2] \quad (4)$$

where $\mu$ and $\sigma_t$ represent the well-known mean and standard deviation, respectively, of the product distribution. The value of AL, average loss per part, is useful as a process performance measure. Also, It will be appreciated that equation (4) provides a simplified way to determine AL in which it is not necessary to measure all N parts in the population. Rather, one can estimate the values $\mu$ and $\sigma_t$ from a sample and compute the associated loss. Also, it should be noted that the expression within the square brackets is the "loss factor" referred to in FIG. 1, block 14 entitled, "Step 3: Compute Loss Factor for Each Measured Dimension".

Partitioning of the Loss Factor

Note in (4) that k is a constant. Thus, the value of the loss is directly proportional to the quantity within the brackets. This quantity, $[(\mu - aim)^2 + \sigma_t^2]$, is commonly referred to as the Mean Squared Error or MSE. Thus, as the MSE increases or decreases the loss shows proportional changes. Equation (4) can be reexpressed as:

$$AL = k*MSE \quad (5)$$

and by partitioning the MSE (loss factor) to various causes, the average loss AL is likewise partitioned. In the injection molding process studied with the molding area diagram data, the total variability, $\sigma_t^2$, can be attributed to several sources:

$$\sigma_t^2 = \sigma_{cav}^2 + \sigma_{proc}^2 + \sigma_{other}^2$$

where $\sigma_t^2$ = total variance around the mean
$\sigma_{cav}^2$ = variance due to cavity-to-cavity biases
$\sigma_{proc}^2$ = variance due to molding temperature and pressure fluctuations
$\sigma_{other}^2$ = variance due to measurement and other random part-to-part effects It is assumed that there is no interaction of cavity biases with the process conditions. By substitution into the definition of MSE, one can then write:

$$MSE = [(\mu - aim)^2 + \sigma_{cav}^2 + \sigma_{proc}^2 + \sigma_{other}^2]$$

Using this result, it becomes possible to examine the percentage of the MSE [which is equivalent to the percentage of average loss AL because of (5)] contributed by each source. Thus, the following loss elements may be defined as:

$$\text{Off-Aim \%} = 100*[(\mu - aim)^2/MSE] \quad (7)$$

$$\text{Cavity Bias \%} = 100*[\sigma_{cav}^2/MSE] \quad (8)$$

$$\text{Process \%} = 100*[\sigma_{proc}^2/MSE] \quad (9)$$

$$\text{Other \%} = 100*[\sigma_{other}^2/MSE] \quad (10)$$

The estimates of these partitioned values are obtained from the molding area diagram data, as explained in the following description.

Estimating the Percentage contributions of Loss Elements

Figure 7:
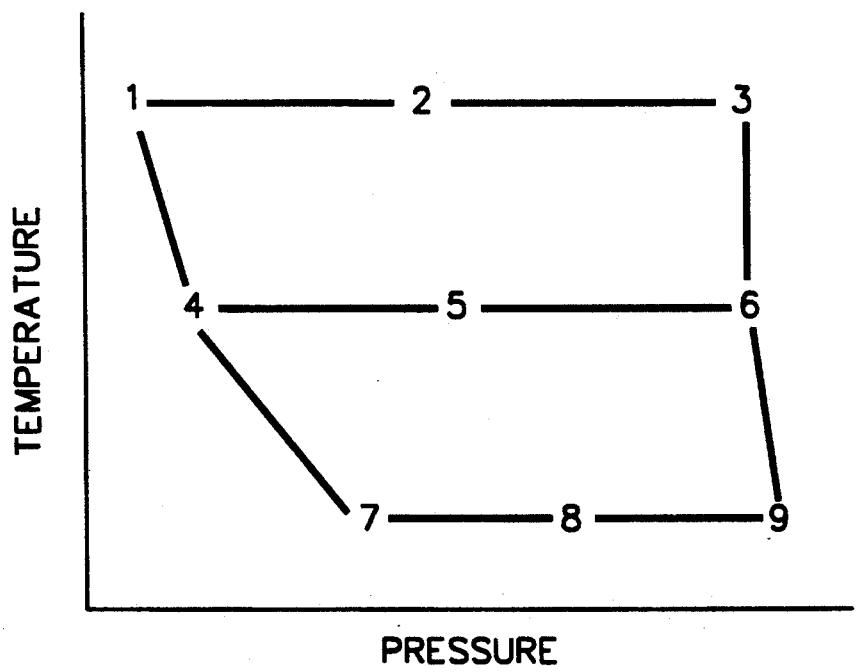
FIG. 7 is a simplified version of a molding area diagram.

What follows is an example of the methodology used for estimating the percentage contributions of the partitioned loss elements set forth above. Assume the use of a molding area diagram having nine temperature-pressure data points as illustrated in FIG. 7. Each of these data points is numbered 1-9 and referred to as such in the description which follows. The temperatures used are at the highest practical value, the lowest practical value and the median value therebetween. Likewise, the pressures used with each temperature are at the lowest practical value, the highest practical value and the median value therebetween. A molding area diagram using such values is a "standard molding area diagram". Also, the following discussion assumes the use of a 32 cavity mold in which the cavities are numbered 1-32.

For any dimension, y, measured on a part let $y_{ij}$ refer to the measured value for the part produced from the ith molding cavity at the jth molding condition. For example, the measured value of the part produced from the sixth molding cavity at the center of the molding area diagram condition would be denoted as $y_{65}$; each data value in the molding area diagram has a similar representation.

Some of the calculations require weighting the data from different points in the molding area diagram. As will be explained below, appropriate weights, $w_j$ may be defined as follows:

$$w_1 = w_3 = w_7 = w_9 = (1/324) \quad (11)$$

$$w_2 = w_4 = w_6 = w_8 = (4/81) \quad (12)$$

and $$w_5 = (64/81) \quad (13)$$

It will be understood that the above defined weights, $w_j$, apply to the case where a standard molding area diagram is used such as that described above and as generally shown in FIG. 7. Those skilled in the art realize that the weights ($w_j$) would be defined differently if the number and/or arrangement of data points in the molding area diagram were to be changed. The method for deriving the weighting factors for the example under discussion is set forth below in the section entitled "Derivation of the Weighting Factors". Those skilled in the art can extend the method described therein to the derivation of weights for use with nonstandard molding area diagrams.

The overall average of the data values is:

$$\bar{y}.. = \sum_i \sum_j y_{ij}/(32*9) \quad (14)$$

The mean value for the ith cavity is estimated by averaging over the nine molding conditions as:

$$\bar{y}_{i.} = \sum_j y_{ij}/9 \quad (15)$$

Similarly, the mean value for the jth molding condition is estimated by averaging over the 32 cavities as:

$$\bar{y}_{.j} = \sum_i y_{ij}/32 \quad (16)$$

The weighted overall average of the data is:

$$\hat{\mu} = \sum_j (w_j^* \bar{y}_{.j}): \quad (17)$$

For estimating the variance components of $\sigma_i^2$, the following definitions are used wherein "SS" means "sum of the squares":

$$SSCav = 9 \sum_i (\bar{y}_{i.} - \bar{y}_{..})^2 \quad (18)$$

$$SSProc = 32 \sum_j (\bar{y}_{.j} - \bar{y}_{..})^2 \quad (19)$$

ten SSOther=SSTotal−(SSCav+SSProc) A Weighted Sum of Squares for Process, WSSP, is computed as:

$$WSSP = \sum_j w_j(\bar{y}_{.j} - \bar{y}_{..})^2 \quad (20)$$

These quantities are used to compute the percentages contributed by each of the loss elements as described below. The best estimate of the process mean is $\hat{\mu}$, the weighted average. Substitution of $\hat{\mu}$ for $\mu$ in equation (7) provides the Off-Aim %. The estimated value of $\sigma_{cav}^2$ is $(1/9)*[(SSCav/31)−(SSOther/248)]$, which can be substituted into (8) to obtain the Cavity Bias %. The estimate of $\sigma_{proc}^2$ is provided by [WSSP−(0.0114)(SSOther/248)], which can be substituted into (9) to obtain the estimated Process %. The estimated value of $\sigma_{other}^2$ is SSOther/248 and can be substituted into (10) to obtain the estimate of Other %.

As stated, the foregoing analysis applies to the case where a 32 cavity mold is used. For molds having a different number of cavities, this analysis can be generalized by changing the number 32 which appears in equations (14), (16) and (19) to the number of cavities involved. Also, the number 31 which appears in the expression of $\sigma_{cav}^2$ must be changed to one less than the number of cavities. Also, in the foregoing definitions of the estimated values of $\sigma_{cav}^2$, $\sigma_{proc}^2$ and $\sigma_{other}^2$, the number 248 must be replaced with a number equal to eight times a number equal to one less than the number of cavities, i.e., 8* (C−1) where C is the number of cavities. Finally, the constant value 0.0114 set forth in the definition of the estimated $\sigma_{proc}^2$ must be replaced by a constant equal to 0.336 divided by the number of cavities.

Rationale for the Estimates

The calculations for obtaining the estimates of $\sigma_{cav}^2$ and $\sigma_{other}^2$ follow the methods of Analysis of Variance and Variance Components analysis under the assumption of no Cavity*Process interaction. The estimates for $\mu$ and $\sigma_{proc}^2$ are derived based on the assumption that the plastic temperature and pressure Will vary over the molding area diagram window. The method of estimation is based on the use of discrete approximations to continuous distributions as discussed by Zaino and D'Errico in their two published articles entitled: (1) "Statistical Tolerancing Using a Modification of Taguchi's Method" published in *Technometrics*, November, 1988, Vol. 30, No. 4 at pp. 397-405 and (2) "Optimal Discrete Approximations for Continuous Outcomes with Applications in Decision and Risk Analysis" published in the *Journal of the Operational Research Society*, Vol. 40, No. 2, 1989, pp. 101-110, said articles being hereby incorporated by reference.

In the foregoing explanation concerning the steps for estimating the percentage contributions of loss elements, the upper and lower boundaries of the molding temperature and pressure are assumed to define $3\sigma$ limits of the marginal normal distributions of these process characteristics. Note that Zaino and D'Errico in the referenced articles refer to the use of $1.732\sigma$ approximation points. Because of this difference, the weights ($w_j$ defined in equations (11), (12) and (13) above were derived to provide appropriate approximation of the continuous distribution by the discrete points available.

Derivation of Weighting Factors

Figure 8:
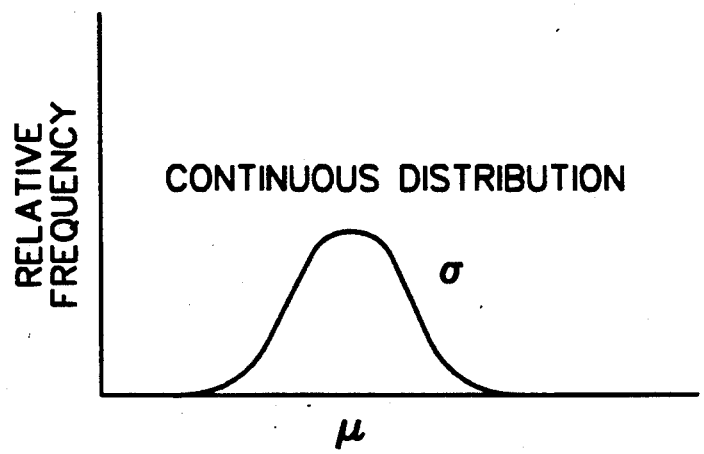
FIG. 8 is a graphical presentation of a continuous distribution which is to be approximated using statistical techniques.
Figure 9:
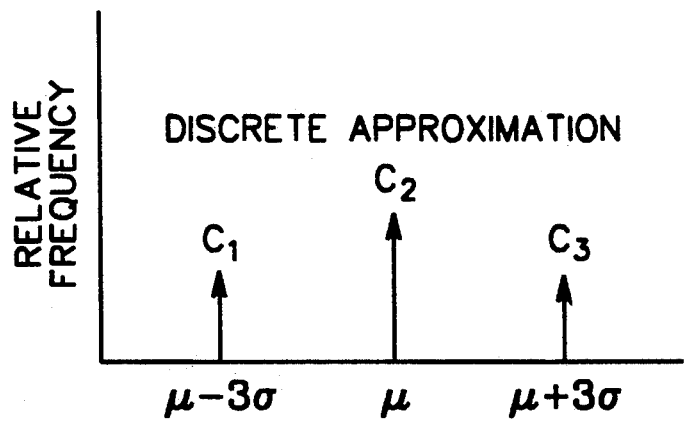
FIG. 9 is a graph showing a discrete distribution of points intended to approximate the continuous distribution of FIG. 8.

As noted above, the method of estimation of Process variation relies on the use of discrete approximations to continuous distributions. The continuous distributions to be approximated (the conditional distributions of temperature and pressure) are assumed to be normally distributed with mean $\mu$ and variance $\sigma^2$, as shown in FIG. 8. FIG. 9 illustrates a discrete distribution of points intended to approximate the continuous distribution of FIG. 8. It should be understood that in both FIGS. 8 and 9, the horizontal axis is used to indicate the value under consideration whether it be temperature or pressure. As shown, the vertical axis in both figures is used to indicate the relative frequency. Those skilled in the art will appreciate that with appropriate weighting the three values shown in FIG. 9 at $(\mu−3\sigma)$, $\mu$, and $(\mu+3\sigma)$ will have the same mean and the same variance as the continuous distribution of FIG. 8. The weights needed to bring about this result are designated as $c_1$, $c_2$ and $c_3$. For the approximation to be accurate, it is required that the weighted mean and weighted variance of the approximation points equal $\mu$ and $\sigma^2$, respectively. Because the distribution is symmetrical, it is required that $c_1=c_3$. Further, the weights are constrained such that $(c_1+c_2+c_3)=1$. In other words:

Weighted Mean =

$$\sum_{i=1}^{3} c_i x_i = c_1(\mu - 3\sigma) + c_2\mu + c_3(\mu + 3\sigma) \equiv \mu$$

and $$\begin{aligned} \text{Weighted Variance} &= \sum_{i=1}^{3} c_i(x_i - \mu)^2 \\ &= c_1[(\mu - 3\sigma) - \mu]^2 + \\ &\quad c_2[\mu - \mu]^2 + c_3[(\mu + 3\sigma) - \mu]^2 \equiv \sigma^2 \end{aligned}$$

where $x_i$ equals the value of temperature or pressure as the case may be and "≡" means "defined to be equal to".

Simultaneous solution of these equations with the above constraints yields $c_1=c_3=1/18$ and $c_2=8/9$. Note that these weights may be used for the discrete approximation of the continuous distributions of both temperature and pressure values. For the joint distribution of temperature and pressure which the nine point molding area diagram (MAD) of FIG. 7 schematically illustrates, the weights $w_j$ are derived by multiplying the conditional weights of the temperature and pressure approximations. It will be understood that the weights tabulated under Column $W_j$ correspond to the nine data points found in a standard molding area diagram such as that shown in FIG. 7. In other words, weight $w_1=1/324$ applies to MAD Point 1. $W_2=4/81$ applies to MAD Point 2 and so forth.

| MAD Point | $C_{pressure}$ | $C_{temperature}$ | $W_j$ |
|---|---|---|---|
| 1 | 1/18 | 1/18 | 1/324 |
| 2 | 8/9 | 1/18 | 4/81 |
| 3 | 1/18 | 1/18 | 1/324 |
| 4 | 1/18 | 8/9 | 4/81 |
| 5 | 8/9 | 8/9 | 64/81 |
| 6 | 1/18 | 8/9 | 4/81 |
| 7 | 1/18 | 1/18 | 1/324 |
| 8 | 8/9 | 1/18 | 4/81 |
| 9 | 1/18 | 1/18 | 1/324 |

Those skilled in the art will appreciate that the above described embodiment of this invention can be modified without departing from its essence. It is intended to encompass all such modifications within the scope of the following claims.

We claim:

1. A method for controlling a dimension of an injection molded product being made with a temperature and pressure-controlled molding machine, a mold having at least one cavity and a molding material having a known operating range of plasticating temperatures and said machine, mold and material combination also having an operating range of injection pressures, said method comprising the steps of:
   (a) making at least one product sample per mold cavity at each of a predetermined number of temperature-pressure settings, said settings comprising a plurality of preselected temperatures spread over the operating range of the molding material and, for each preselected temperature, a plurality of preselected pressures spread over the pressure operating range of the machine, mold and material combination being used;
   (b) measuring the dimension in question on each sample;
   (c) computing a loss factor value for the dimension in question;
   (d) partitioning the loss factor value into percentages of loss contributed by a predetermined set of loss elements;
   (e) adjusting the loss element contributing the greatest percentage of loss.

2. The method of claim 1 wherein temperature-pressure settings in step (a) form a standard molding area diagram.

3. The method of claim 1 wherein the loss factor computed in step (c) is equal to:

$$(\mu - \text{aim})^2 + \sigma_t^2$$

where:
$\mu$ = the mean deviation of the product dimension from aim
aim = the desired product dimension and
$\sigma_t$ = standard deviation of the product 1, dimension from aim.

4. The method of claims 1, 2 or 3 wherein the loss factor is partitioned in step (d) into contributing percentages attributable to "off-aim percentage", "cavity bias percentage", "process percentage" and "other percentage".

5. The method of claim 4 wherein the "off-aim percentage" is computed according to the formula:

$$\textit{Off-Aim Percentage} = 100[\mu - \text{aim})^2/MSE]$$

where:
$\mu$ = the mean deviation of the product dimension from aim
aim = the desired value for the product dimension
$MSE = (\mu - \text{aim})^2 + \sigma_t^2$, $\sigma_t$ being the standard deviation of the product dimension from aim.

6. A method for controlling an injection molding process being used to make a product having a predetermined number of critical dimensions, said process being performed with a temperature and pressure-controlled molding machine, a mold having at least one cavity and a molding material having a known operating range of plasticating temperatures and said machine, mold and material combination also having an operating range of injection pressures, said method comprising the steps of:
   (a) making at least one product sample per mold cavity at each of a predetermined number of temperature-pressure settings, said settings comprising a plurality of preselected temperatures spread over the operating range of the molding material and, for each preselected temperature, a plurality of preselected pressures spread over the pressure operating range of the machine, mold and material combination being used;
   (b) measuring the critical dimensions of each product sample;
   (c) computing a loss factor value for each critical dimension;
   (d) identifying the highest loss factor value;
   (e) partitioning the identified loss factor value into percentages of loss contributed by a predetermined set of loss elements;
   (f) adjusting the loss element contributing the greatest percentage of loss.

7. The method of claim 6 wherein the temperature-pressure settings in step (a) form a standard molding area diagram.

8. The method of claim 6 wherein each loss factor computed in step (c) is equal to:

$$(\mu - \text{aim})^2 + \sigma_t^2$$

where:
$\mu$ = the mean deviation of the product dimension from aim
aim = the desired product dimension and
$\sigma_t$ = standard deviation of the product dimension from aim.

9. The method of claims 6, 7 or 8 wherein the loss factor is partitioned in step (e) into contributing percentages attributable to "off-aim percentage", "cavity bias percentage", "process percentage" and "other percentage".

10. The method of claim 9 wherein the "off-aim percentage" is computed according to the formula:

$$\textit{Off-Aim Percentage} = 100[(\mu - \text{aim})^2/MSE$$

where:
$\mu$ = the mean deviation of the product dimension from aim
aim = the desired value for the product dimension
$MSE = (\mu - \text{aim})^2 + \sigma_t^2$, $\sigma_t$ being the standard deviation of the product dimension from aim.

* * * * *

UNITED STATES PATENT AND TRADEMARK OFFICE
CERTIFICATE OF CORRECTION

PATENT NO. : 5,246,644
DATED : September 21, 1993
INVENTOR(S) : James J. Wenskus and Michael W. Dupin It is certified that error appears in the above-indentified patent and that said Letters Patent is hereby corrected as shown below:

In column 3, line 44, "los" should be --loss--.

In column 9, line 58, "Will" should be --will--.

In column 10, line 56, "=" should be --≠--.

In column 11, line 22, "claims." should be --claims:--

In column 11, line 62, "Product 1," should be --Product 1.--.

Signed and Sealed this

Fifth Day of April, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,246,644

DATED : September 21, 1993

INVENTOR(S) : James J. Wenskus and Michael W. Dupin

It is certified that error appears in the above-indentified patent and that said Letters Patent is hereby corrected as shown below:

In column 11, line 62, "Product 1." should be ---product---

Signed and Sealed this

Fifteenth Day of November, 1994

Attest:

BRUCE LEHMAN

*Attesting Officer*     *Commissioner of Patents and Trademarks*